United States Patent
Henry et al.

(10) Patent No.: US 8,230,103 B2
(45) Date of Patent: Jul. 24, 2012

(54) METHOD AND DEVICE FOR ACCESS TO A DIGITAL IMAGE STORED ON A SERVER COMPUTER

(75) Inventors: Félix Henry, Rennes (FR); Maryline Clare, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 1337 days.

(21) Appl. No.: 11/066,214

(22) Filed: Feb. 28, 2005

(65) Prior Publication Data

US 2005/0196050 A1    Sep. 8, 2005

(30) Foreign Application Priority Data

Mar. 8, 2004   (FR) .................................... 04 02396

(51) Int. Cl.
  *G06F 15/16* (2006.01)
  *G06K 9/36* (2006.01)
  *G06K 9/32* (2006.01)
(52) U.S. Cl. ........ 709/232; 709/203; 709/229; 382/232; 382/300
(58) Field of Classification Search .................. 709/203, 709/229, 219, 232; 382/300, 232
See application file for complete search history.

(56) References Cited

U.S. PATENT DOCUMENTS

| | | | |
|---|---|---|---|
| 5,563,960 A | 10/1996 | Shapiro | |
| 6,118,903 A | 9/2000 | Liu | |
| 6,278,735 B1 | 8/2001 | Mohsenian | |
| 7,149,370 B2 * | 12/2006 | Willner et al. | 382/305 |
| 2001/0051998 A1 * | 12/2001 | Henderson | 709/217 |
| 2002/0040386 A1 | 4/2002 | Berthelot et al. | |
| 2003/0018751 A1 * | 1/2003 | Lee et al. | 709/219 |
| 2003/0065802 A1 * | 4/2003 | Vitikainen et al. | 709/231 |
| 2006/0170955 A1 * | 8/2006 | Gormish | 358/1.15 |

FOREIGN PATENT DOCUMENTS

| | | |
|---|---|---|
| EP | 1 192 822 | 4/2002 |
| JP | 7-327094 | 12/1995 |

OTHER PUBLICATIONS

Monnier, G., "Flash MX", Dunod, Paris, 2002.
http://www.flashloaded.com/flashcomponents/360panviewer, dated Sep. 7, 2006.

* cited by examiner

*Primary Examiner* — Haresh N Patel
*Assistant Examiner* — Peter Shaw
(74) *Attorney, Agent, or Firm* — Fitzpatrick, Cella, Harper & Scinto (57) ABSTRACT

A method of access by a client computer to a digital image stored on a server computer via a communication network, the digital image being represented by sets of digital data associated respectively with various blocks (Bi) and various resolution levels (Rj) of the image or with various blocks (Bi) and various quality levels (Qk) of the image, comprises a step (E47) of identifying a set of data to be acquired, a step (E48) of calculating the size in bits (b) of the set of data to be acquired, a step (E49) of comparing a number of acquired data bits (B) incremented by the calculated size (b) with a predetermined bit threshold value (S), and a step (E52) of acquiring the set of data identified if the number of data bits acquired incremented by the calculated size (B+b) is less than the predetermined bit threshold value (S).

Has particular use for limiting free access to a digital image.

18 Claims, 6 Drawing Sheets

METHOD AND DEVICE FOR ACCESS TO A DIGITAL IMAGE STORED ON A SERVER COMPUTER

The present invention concerns a method of access by a client computer to a digital image stored on a server computer via a communication network.

It also concerns a device for access to a digital image adapted to implement the method according to the invention.

This invention concerns in general terms the transfer of digital images over a communication network, such as for example the broadcast of animations of the flash type containing images according to the JPEG2000 standard.

The flash format is defined by the company Macromedia, by means of content creation software, a description of which is given in particular in the manual "Flash MX" by Guylaine Monnier, published by Dunod, Paris, 2002.

Many Internet sites offer access to high-resolution digital images, such as for example satellite, artistic etc photographs. However, these sites, which profit from the sale of these images, must find a compromise in the promotion of their activities: they cannot in fact give access to the entire image, which would deprive them of a source of revenue, but sufficiently disclose the content of the image so that a client can judge the advantage of accessing or not this digital image, and for example purchasing it.

Various solutions have been proposed by sites allowing access to high-resolution digital images. For example, only the low-resolution version of a digital image is available. However, a user cannot gain an exact idea of the high-resolution quality which he expects to acquire.

Another solution consists of making the high-resolution version of the image available and adding to it, in superimposition, an artificial image for concealing the original image. In this solution, the superimposed image may however conceal an area of the image to which a user would wish to have access in order to assess the advantage of purchasing this image.

Finally, other sites make the image accessible and eliminate the possibility of saving the image in a computer program associated with the image. However, it is easy to get round this method since many software packages enable clients to save the content of the screen associated with a client computer.

The purpose of the present invention is to resolve the aforementioned drawbacks and to propose a method of access by a client computer to a digital image, particularly well suited to the requirements of each user, whilst preventing complete access to the image.

The present invention thus concerns a method of access by a client computer to a digital image stored on a server computer via a communication network, the digital image being represented by sets of digital data associated respectively with various blocks and various resolution levels of the image or with various blocks and various quality levels of the image.

This access method comprises the following steps:
identifying a set of data to be acquired amongst said sets of digital data representing the image;
calculating the size in bits of said set of data to be acquired;
comparing a number of data bits acquired incremented by said calculated size with a predetermined threshold value of bits; and
acquiring said identified set of data if said number of data bits acquired incremented by said calculated size is less than said predetermined bit threshold value.

The present invention also concerns a method of access by a client computer to a digital image stored on a server computer via a communication network, the digital image being represented by sets of digital data associated respectively with at least two various blocks and various resolution levels of the image and various quality levels of the image.

This access method comprises the following steps:
identifying a set of data to be acquired amongst said sets of digital data representing the image;
calculating the size in bits of said set of data to be acquired;
comparing a number of data bits acquired incremented by said calculated size with a predetermined threshold value of bits; and
acquiring said identified set of data if said number of data bits acquired incremented by said calculated size is less than said predetermined bit threshold value.

Thus access to a set of digital data representing data of the image is permitted within the limit of a certain number of data bits acquired.

Access to digital data representing the image is therefore authorized within the limit of a certain budget of downloaded bits.

Consequently the client computer can access any set of digital data associated with the image, within the limit of a predetermined budget of bits, and thus allow free manipulation of the image.

The present invention thus enables a client computer to access solely part of the content of a digital image.

According to a preferred characteristic of the invention, the access method comprises a step of updating a number of data bits acquired by adding the size of said set of acquired data.

This updating step makes it possible to permanently store the number of acquired data bits.

According to another preferred characteristic of the invention, the bit threshold value is predetermined according to the size in bits of the sets of digital data associated with the image.

It is thus possible to determine a budget in terms of bits according to the size of the digital data representing the various blocks of the image, their resolution level and the various quality levels accessible.

This bit threshold value can be controlled at the server computer, for example by the creator of the digital image.

This bit threshold value is preferably equal to a percentage lying between 25% and 50% of the size in bits of said sets of digital data associated with the image.

A budget in bits thus predetermined makes it possible to authorize sufficient access to the digital image so that the user can assess the content thereof whilst preventing access to the entire digital image, at its highest resolution and quality level.

In order to facilitate the management by the client computer of the access to the digital image, the access method also comprises a step of displaying a number of data bits acquired, enabling the user to compare the number of data bits acquired with respect to a predetermined bit threshold value.

In order to facilitate the implementation of the comparison step, this is implemented on the client computer, using the predetermined bit threshold value stored on this client computer.

Finally, the access method also comprises a step of displaying a warning message on the client computer when the number of data bits acquired incremented by the size in bits of the set of data to be acquired is greater than the predetermined bit threshold value.

The exceeding of the budget in bits allowed by the server computer for access to the digital image is thus indicated to the user.

Correspondingly, the present invention concerns a device for access to a digital image stored on a server computer via a communication network, this digital image being represented by sets of digital data associated respectively with various blocks and various resolution levels of the image or with various blocks and various quality levels of the image.

This access device comprises:
- means for identifying a set of data to be acquired amongst the sets of digital data representing the image;
- means for calculating the size in bits of said set of data to be acquired;
- means for comparing a number of data bits acquired incremented by said calculated size with a predetermined threshold value of bits; and
- means for acquiring said identified set of data if said number of data bits acquired incremented by said calculated size is less than said predetermined bit threshold value.

The present invention also concerns a device for access to a digital image stored on a server computer via a communication network, this digital image being represented by sets of digital data associated respectively with at least two various blocks and various resolution levels of the image and various quality levels of the image.

This access device comprises:
- means for identifying a set of data to be acquired amongst the sets of digital data representing the image;
- means for calculating the size in bits of said set of data to be acquired;
- means for comparing a number of data bits acquired incremented by said calculated size with a predetermined threshold value of bits; and
- means for acquiring said identified set of data if said number of data bits acquired incremented by said calculated size is less than said predetermined bit threshold value.

This access device is preferably integrated into a client computer of a communication network.

This access device has characteristics and advantages similar to those of the method according to the invention.

The present invention also concerns a computer comprising means adapted to implement the access methods according to the invention.

It also concerns a communication network comprising means adapted to implement the access methods according to the invention.

It also relates to an information storage means, possibly partially or totally removable, which can be read by a computer system, comprising instructions for a program adapted to implement the methods of access to a digital image according to the invention when the program is loaded into and executed by the computer system.

Finally, the present invention concerns a computer program which can be read by a microprocessor, comprising portions of software code adapted to implement the methods of access to a digital image when said computer program is loaded into and executed by the microprocessor.

The computer, communication network, information storage means and computer program have characteristics and advantages similar to the method which they implement.

Other particularities and advantages of the invention will also emerge from the following description.

In the accompanying drawings, given by way of non-limiting examples.

Figure 1:
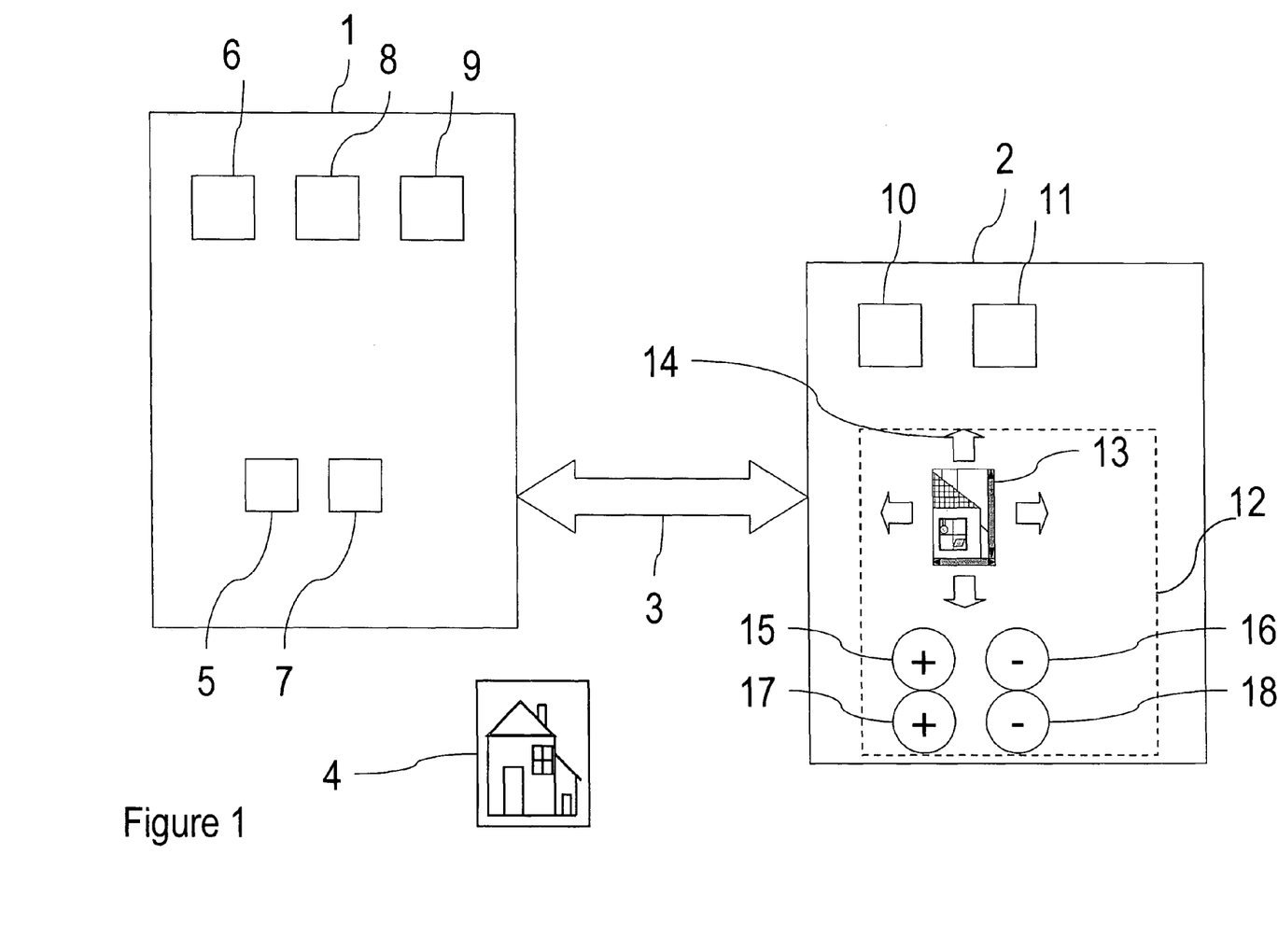
FIG. 1 illustrates schematically a communication network adapted to implement the method of access to a digital image according to the invention.

A description will be given first of all with reference to FIG. 1 of a communication network adapted to implement a method of access to a digital image.

In such a communication network, a server computer 1 is connected to the client computer 2 by means of a communication network 3. Such a communication network can consist typically of the Internet.

A digital image 4 is stored on a server computer 1 with a view to its broadcast over the communication network, in particular to the client computer.

This digital image 4 is represented by digital data stored in compressed form. By way of example, this digital image 4 can be to the JPEG2000 format. Such a JPEG2000 file is structured in the form of blocks, resolution levels and quality levels or layers.

Thus the sets of digital data representing the image are associated with various blocks of the image and/or various resolution levels of the image and/or various quality levels of this image.

Figure 2:
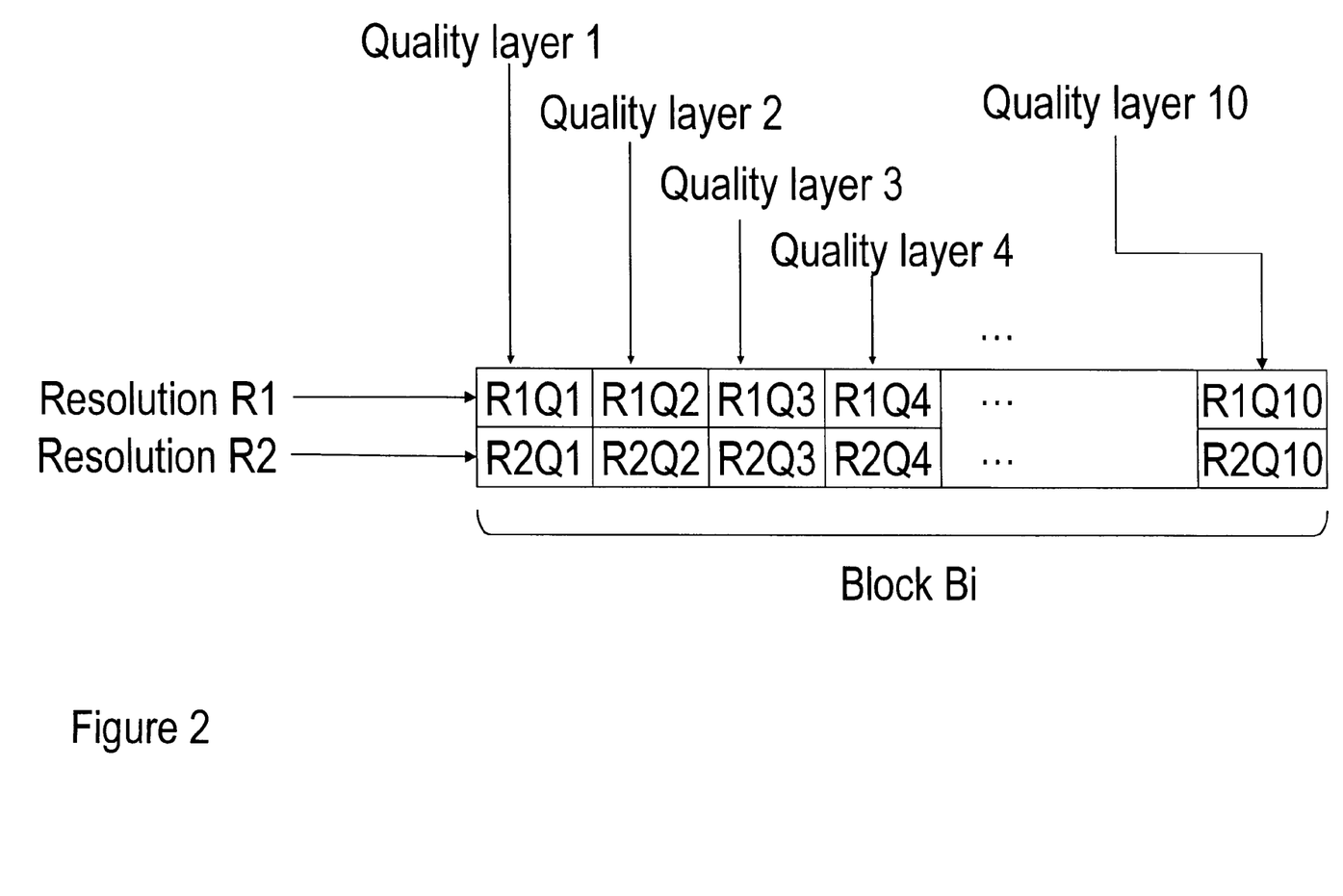
FIG. 2 is a schematic illustration of the sets of digital data representing an image.

As clearly illustrated in FIG. 2, the digital image is divided into blocks corresponding to a spatial division of the digital image. Thus each block $B_i$ corresponds to a location in the digital image.

In addition, for each block $B_i$, several resolution levels $R_j$ are accessible.

Finally, for each resolution level $R_j$, several quality levels $Q_k$ can be offered.

In the example in FIG. 2, for each block $B_i$, two resolution levels $R_1$ and $R_2$ are accessible, each of these levels being proposed according to ten quality levels $Q_1$ to $Q_{10}$. It can also be considered that the digital image consists of four blocks $B_1$, $B_2$, $B_3$ and $B_4$.

Thus each set of digital data associated with a block $B_i$, a resolution level $R_j$ and a quality level $Q_k$ is adapted to represent a portion of the digital image at a given resolution level and quality level.

The digital image is itself represented by all these sets of digital data characterized respectively by the groups $B_i$, $R_j$ and $Q_k$.

Each of these sets of data, characterized by its location $B_i$, a resolution level $R_j$ and a quality level $Q_k$, is accessible independently in the JPEG2000 data file so as to obtain a representation of the part of the image, at given resolution and quality levels.

Returning to FIG. 1, an animation written in an SWF file 5 is stored. The server computer 1 contains software 6 for creating content to the Flash format. This software can for example be the Flash MX software specified by Macromedia. This software 6 thus makes it possible to create an animation stored in the SWF file 5, which includes a reference to a file 7 in JPEG2000 format which makes it possible to store the image 4 to the compressed format.

The server computer 1 also contains Internet server software 8 which makes it possible in particular to get an Internet site on line. This Internet server software 8 enables a client computer to access various contents stored on the server computer 1 via the communication network.

Finally, the server computer 1 can contain Internet payment software 9 which enables users connected to the server computer 1 to make purchases on the communication network 3.

In a similar manner, the client computer 2 connected to the communication network 3 comprises Internet browser software 10, of the Explorer, Netscape or Opera software type.

In addition, the client computer 2 comprises software for reading Flash animations to the SWF format, as stored in the file 5 of a server computer 1. This software 11, called Flash Plug-In, makes it possible to interpret the animations stored in an SWF file 5.

In particular, the client computer 2 comprises a display space 12, such as a screen, which makes it possible in particular to display a part 13 of the image 4.

The animation of the SWF file 5, when it is interpreted by the plug-in software 11, makes it possible to display, parallel to the portion of the image 13, various elements 14, 15, 16, 17, 18 which make it possible to modify the part of the image 13 currently being displayed.

In particular, arrows 14 make it possible to move by translation from one area of the image to another. With reference to FIG. 2, a movement in the image corresponds to the display of a block different from this image.

In addition, buttons 15, 16 make it possible to modify the resolution of the image currently being displayed. These buttons 15, 16 thus make it possible to modify the resolution level R1 or R2 as defined with reference to FIG. 2.

Thus, when the resolution is enlarged by a factor of 2, the display of the image corresponds to a zoom in this image.

Finally, the buttons 17, 18 make it possible to improve or degrade the quality of retrieval of the part of the image 13 currently being displayed. It thus makes it possible, for a given block Bi and resolution level Rj, to modify the quality factor Qk. In practice, a ratio of the signal to noise is modified.

This type of device, as described with reference to FIG. 1, thus enables the server computer 1 to present part of an image which it wishes to make available to a potential client, in particular at the time of an actual sale of this image.

A description will now be given, with reference to FIG. 3, of a method of creating an SWF file, such as the file 5 described previously with reference to FIG. 1, which makes it possible to offer an animation of an image to a client computer according to the access method in accordance with the invention.

This method of creating an SWF file is implemented on a server computer 1 as described previously.

This creation method comprises first of all a step E30 of selecting an image to the JPEG2000 format.

In practice, an image is selected in the file 7 containing digital images compressed according to the JPEG2000 standard.

Next, a step E31 of suggesting a budget in terms of bits can possibly be implemented during this process of creating an SWF file.

This budget in bits associated with a digital image can thus constitute a bit threshold value S beyond which a client computer 2 will not be able to access additional data representing the image unless it has obtained prior authorization from the server, and generally against payment of the price of the image to be displayed.

This budget in bits S is preferably predetermined according to the size in bits of the sets of digital data associated with the image.

In practice, this suggestion step E31 requires calculating the size of the file storing the digital image 7. The content creation software 6 thus calculates the size in bits of the file 7.

The budget in bits can then be equal to a percentage of between 25% and 50% of the size in bits of the sets of digital data associated with the image.

By way of non-limiting example, if the image file 7 represents a million bits in memory, the content creation software 11 will suggest a budget in bits S corresponding for example to 50% of this file size. In this example, the content creation software 6 will suggest a budget in bits equal to 500,000 bits.

The value of this budget in bits must be determined so as to be sufficient to allow access by the user to a significant part of the image, in order to assess the content, without however allowing free access to almost all the image.

The applicant found that, by fixing this budget in bits at between 25% and 50% of the size in bits of the file storing the image to the JPEG2000 format, a satisfactory compromise was obtained in regulated access to this image.

A step E32 of determining the budget in bits is then implemented.

It makes it possible to choose at the server computer 1 a budget in bits S associated with the image. In practice, this budget in bits S can be equal to the budget in bits suggested at the suggestion step E31 automatically by the content creation software 6. This value can also be modified by an administrator of the server computer 1.

A writing step E33 next makes it possible to write this budget in bits S in an SWF file 5. In practice, the Action Script language as described in the book "Flash MX" by Guylaine Monnier, published by Dunod, Paris, 2002, is used. A variable entitled for example BitsBudget is created and a value of 50,000 bits for example is allocated to it.

The writing of the budget in bits S in the SWF file then makes it possible to directly manage at the client computer 2 the size of the data downloaded with respect to the predefined budget in bits S.

Alternatively, this budget in bits S may not be written in an SWF file but only stored in memory in the server computer 1. The control of the size of the data transmitted with respect to this budget in bits is then carried out at the server computer 1.

A step E34 of writing the browsing control functions in the SWF file is then implemented. As described previously with reference to FIG. 1, these functions allow in particular the display of the image 13 and of the various buttons 14, 15, 16, 17 and 18 making it possible to manage various actions of manipulation of the image.

These browsing control functions are well known in the field of Flash animations and do not need to be described in detail here.

In this regard the electronic document at the address www-.flashloaded.com/360panviewer.php can be consulted.

Finally, a step E35 of writing the information associated with the image to the JPEG2000 format is implemented. In practice, a reference to the image 7 is written in the SWF file 5. This reference corresponds to a block of the image, for example the block B1, corresponding to a resolution R1 which is the lowest resolution, and to a quality level Q1 which is the lowest quality level.

In practice, in the ActionScript language, which makes it possible to construct an animation to the SWF format, the writing step E35 consists of creating in the SWF file an empty clip object called "container", and creating in this SWF file a function of loading the image by means of a function Load-Movie. This function LoadMovie is described in particular in the guide "Flash MX" referred to previously and makes it possible to load either fixed images or videos. This function LoadMovie makes it possible to specify in particular the resolution R1 of the image requested.

The writing in the SWF file can thus be to the following format:

"container. LoadMovie ("image 1.jp2", B1, R1, Q1)"

Figure 4:
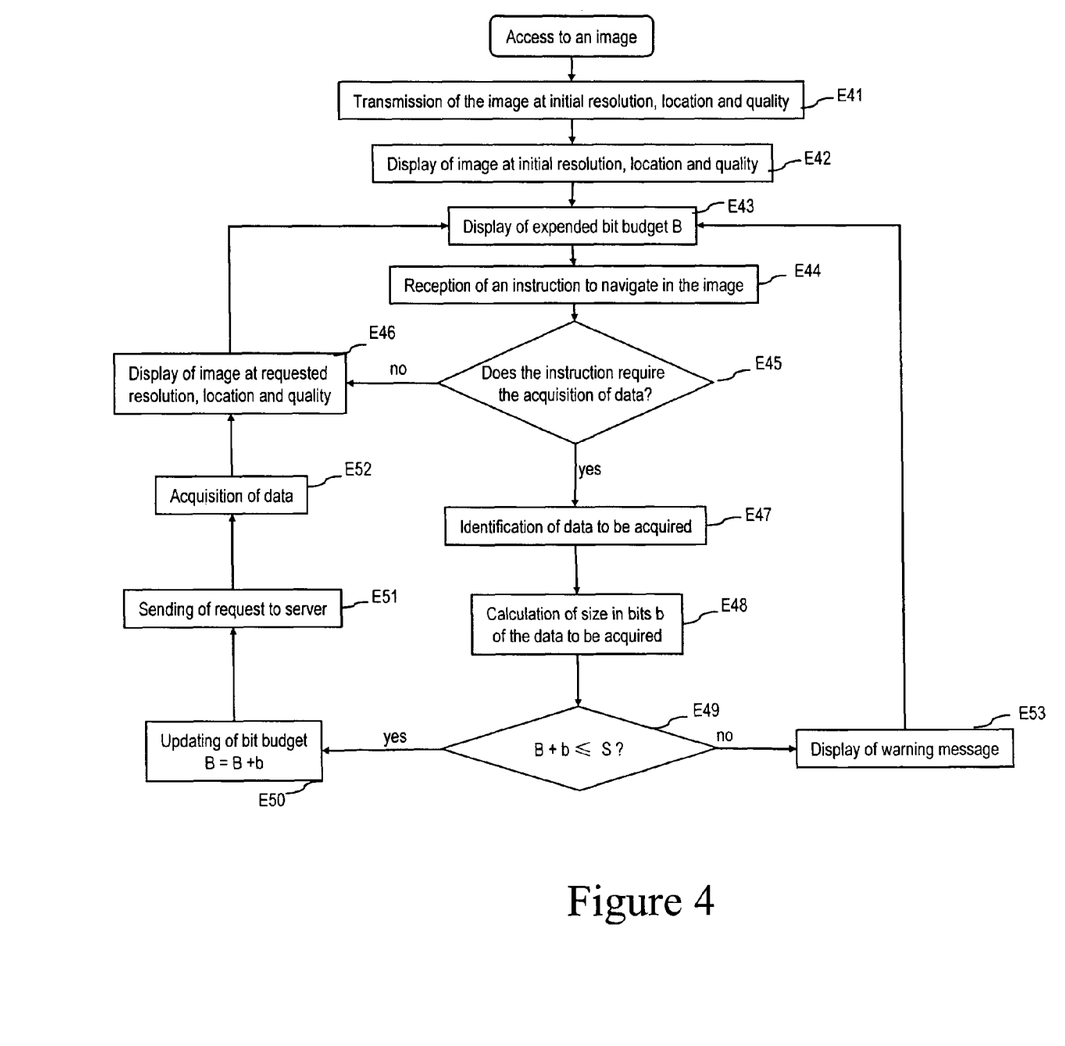
FIG. 4 is an algorithm illustrating a method of access to an image according to one embodiment of the present invention.

A description will now be given with reference to FIG. 4 of the method of access by the client computer 2 to a digital image thus referenced by an SWF file stored on a server computer 1.

This access method is implemented at a client computer 2 when it connects to the server computer 1 via the communication network 3 in order to access a multimedia content.

A transmission step E41 is first of all implemented to cause the loading of part of the image at an initial resolution and quality level.

During this transmission step E41, the SWF file 5 stored on the server computer 1 is loaded at the client computer 2 and interpreted by the plug-in software 11. The interpretation of the SWF file makes it possible to download onto the client computer 2 a set of digital data of the image file 7 corresponding to the block B1, at a resolution level R1 and a quality level Q1 of the image.

Figure 5:
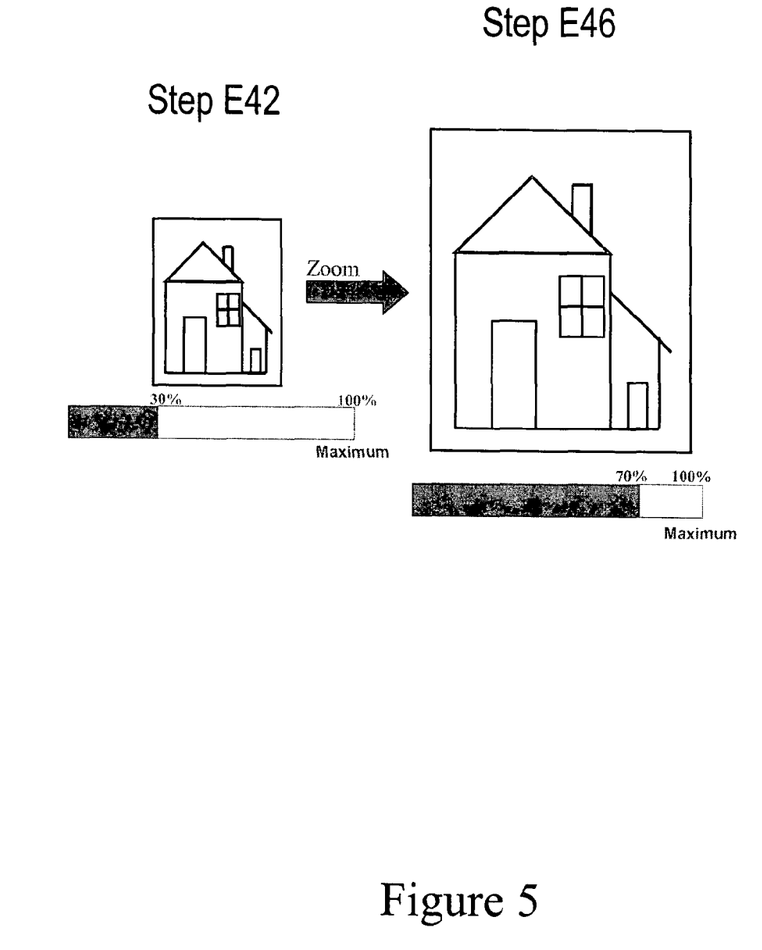
FIG. 5 is an illustration of the display of an image and of an associated budget in terms of bits expended.

A display step E42 is then implemented in order to display the block B1 of the image at the resolution R1 and quality Q1. This display step E42 is illustrated in FIG. 5.

A second display step E43 is then implemented to allow the display and visualization by the user of the client computer of the budget in bits B expended at the time of acquisition of this image.

In practice, the browsing control function included in the SWF file 5 downloaded onto the client computer 2 is adapted to calculate the quantity of digital data downloaded, that is to say the size in bits of all the digital data downloaded. In this embodiment, this calculation is made directly on the server computer 2 using the downloaded SWF file 5.

Figure 3:
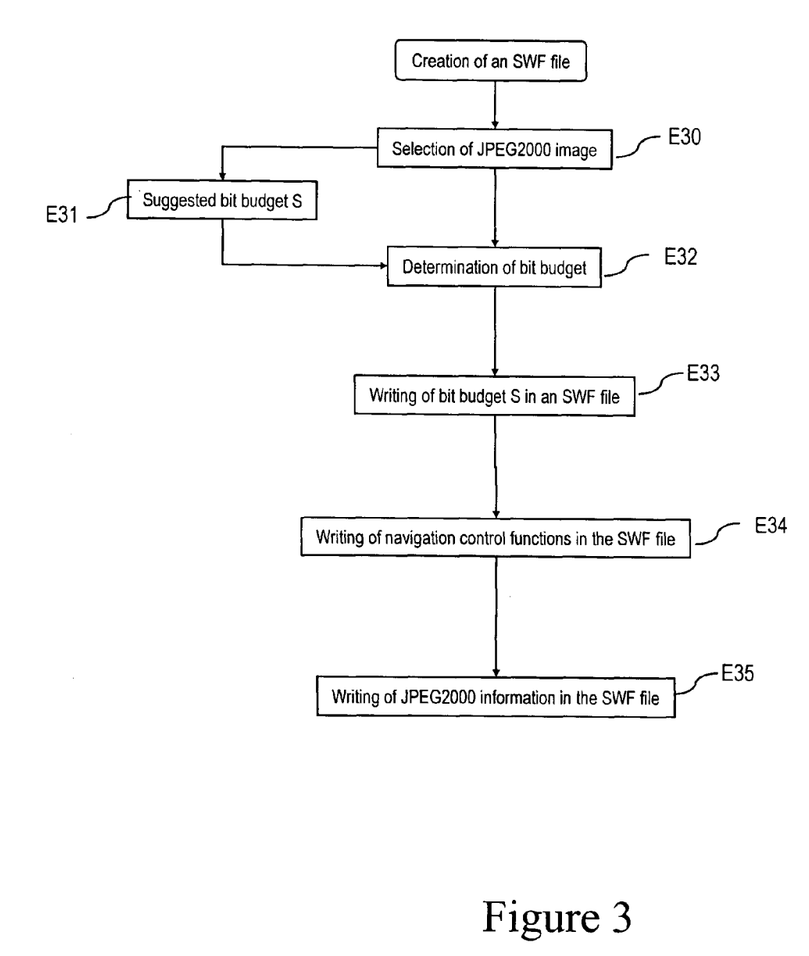
FIG. 3 is an algorithm illustrating the creation of an SWF file.

It is assumed here by way of example that the size in bits of all the data downloaded is equal to 150,000 bits and thus represents 30% of the threshold value of bits S determined previously with reference to FIG. 3.

It is then possible to display, as illustrated in FIG. 5, information representing the number of data bits acquired, thus corresponding to the expended budget in bits B, according to the authorized budget in bits S.

By way of non-limiting example, this information can take the aspect of a progress bar lying between 0 and 100% of the bit threshold value S. A percentage of the length is colored, this percentage corresponding to the percentage of the budget in bits expended with respect to the bit threshold value S.

The method of access to an image can possibly be interrupted here as long as the user of the client computer does not give an instruction to navigate in the image.

Otherwise a step E44 of receiving an instruction to navigate in the image is implemented on the client computer 2.

This instruction to navigate in the image is made by means of the arrows 14 and the buttons 15, 16, 17 and 18 as described previously. It makes it possible in particular to obtain other parts of the image or to increase or decrease the resolution of a portion of image displayed, or to degrade or improve the quality thereof.

When an instruction to navigate in the image is received, a test step E45 makes it possible to determine whether this navigation instruction requires the acquisition of a set of data.

The acquisition or not of additional data depends on the type of navigation instruction. In particular, if the instruction consists of reducing the resolution of the image displayed or degrading the quality level, then it is not necessary to acquire a set of additional digital data. Likewise, if the navigation instruction consists of performing a translation in one or more of the blocks of the image already downloaded onto the server computer 2, it is not necessary to acquire a set of additional data.

On the other hand, if the navigation instruction consists of increasing the resolution of the image to a resolution not yet available on the client computer, or increasing the quality level of the image to a quality level not yet available on the client computer, it is then necessary to acquire a set of additional data.

Likewise, if a translation in the image ("traveling") is requested outside the blocks of the image already downloaded onto the client computer, then it is necessary to request a set of additional data.

In the first case, if at the end of the test step 45 it is not necessary to acquire new data, a display step E46 is implemented as previously in order to display an image according to the navigation instruction received at the reception step E44. Thus the image is displayed with requested resolution and quality levels, as well as the expended budget in bits B, which in this case is not modified.

If on the other hand, at the end of step E45, the navigation instruction requires the acquisition of additional data, a step E47 of identifying a set of data to be acquired amongst the sets of digital data representing the image is implemented.

This identification step E47 consists of identifying a set of data characterized by the references Bi, Rj, Qk.

Thus if, as from the display of the data B1, R1, Q1, the user wishes to increase the resolution of this part of the image, the set of data to be acquired will correspond to the data associated with the block B1, at resolution R2 and quality Q1.

Likewise, if an increase in the quality level is required, and the data associated with the block B1, at resolution R1 and quality Q2, are not available on the client computer 2, this set of data must be acquired.

Finally, if a translation to another block, for example the block B2 of the image, is requested by the user, and the data associated with the block B2, at resolution R1 and quality Q1, are not available on the client computer 2, this set of data must be acquired.

Once the set of data to be acquired is identified, a calculation step E48 is implemented in order to calculate the size in bits b of the data to be acquired.

By way of non-limiting example, the size in bits of the data associated with the block B1, at the resolution R2 and a quality level Q1, is calculated.

A comparison step E49 is then implemented in order to compare the number of data bits already acquired B incremented by the size of the data to be acquired b with the predetermined bit threshold value S.

In practice, the size in bits b of the data to be acquired is added to the expended budget in bits B and this value is compared with the bit threshold value S corresponding to the predefined budget in bits.

If the value B+b is less than or equal to the bit threshold value S, then a step E50 of updating the expended budget in bits is implemented. This updating step E50 consists of incrementing the budget in expended bits B of the value b of the size of the data to be acquired.

Next, a step E51 of sending a request to the server computer 1 is implemented in order to require all the additional data, for example corresponding to the block B1, R2, Q1.

An acquisition step E52 is then implemented on the client computer 2 in order to acquire the set of identified data transmitted by the client computer 1.

Finally, the display step E46 is implemented in order to display the image at the requested resolution R2 and quality level Q1, on the block B1.

This display step E46 is for example illustrated in FIG. 5.

The display step E43 is also reiterated in order to display the updated expended budget in bits B.

In this example, it is considered that the set of data acquired represents approximately 70% of the bit threshold value S.

All of steps E44 to E52 can then be reiterated as long as the user of the client computer 2 gives instructions to navigate in the image.

If at the end of the test step E49 the number of data bits already acquired B incremented by the size of the data to be acquired b is greater than the bit threshold value S, a display step E53 is implemented in order to display a warning message for the attention of the user of the client computer 2.

This warning message indicates to the user that the allocated bit budget S is exceeded. This warning message can be a text message. The user then has the possibility of giving a new instruction to navigate in the image, within the limit of the allowed bit budget S. Moreover, the user may have the possibility of continuing to navigate in the image after having paid the price for this by means of the Internet payment software 9. In this case, access to the image is authorized in its entirety and departs from the scope of this invention.

Thus the access method according to the invention makes it possible to be adapted to each user, each of them being able to have a different way of evaluating an image, whilst preventing complete access to the image.

Figure 6:
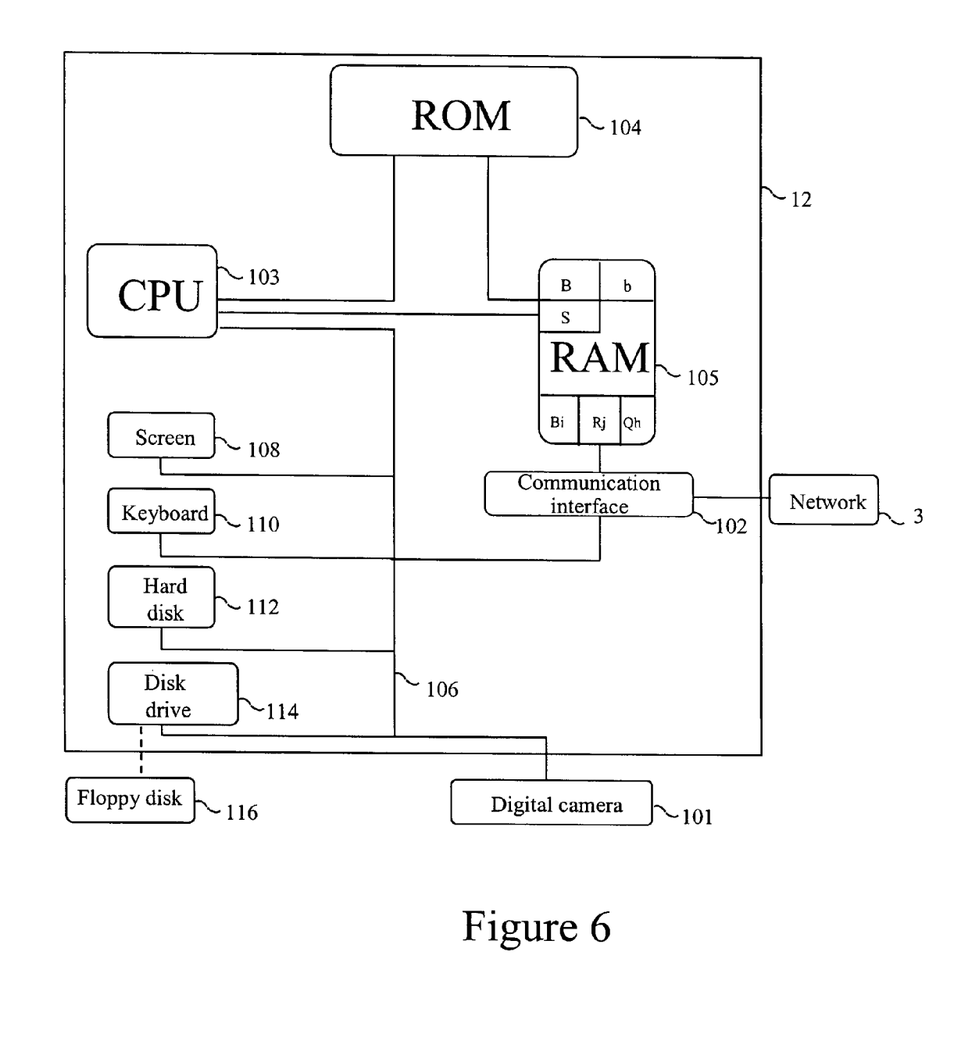
FIG. 6 is a block diagram illustrating a computer adapted to implement the access method according to the invention.

A device adapted to implement the present invention will now be described with reference to FIG. 6.

This device can, for example, be a microcomputer 1, 2 constituting either a server computer 1, or a client computer 2 connected to a communication network 3.

It comprises in particular means for identifying digital data to be acquired, means for calculating the size in bits b of the data to be acquired, means for comparing the size B+b with a threshold value S, data acquisition means and means for updating the number of acquired data bits B.

The microcomputer can be connected to various peripherals, for example a digital camera 101, or a scanner or any other digital image acquisition means. This digital camera 101 is adapted to supply, by means of a graphics card, digital images which can be processed according to the methods described above.

The microcomputer 1, 2 comprises a communication interface 102 connected to the communication network 3 and adapted to transmit digital information. A central unit 103 (denoted CPU in FIG. 6) will execute the instructions relating to the implementation of the invention, instructions stored in the read only memory 104 or in other storage elements. On powering up, the processing programs and methods stored in one of the non-volatile memories, for example the ROM (Read Only Memory) 104 are transferred into the RAM (Random Access Memory) 105, which will then contain the executable code of the invention as well as the variables necessary for implementing the invention.

In a variant, the processing methods can be stored in other parts of the computer. This is because it is possible to improve the method implemented by possibly adding new methods transmitted either by the communication network 3 or by means of a floppy disk.

A communication bus 106 affords communication between the various sub-elements of the microcomputer 1, 2 or connected to it. The representation of the bus 106 is not limiting and in particular the central unit 103 is able to communicate instructions to any sub-element of the computer 1, 2 directly or by means of another sub-element of the microcomputer.

The computer 1, 2 also has a screen 108 for displaying the information to be processed or serving as an interface with the user, who will thus be able to parameterize certain processing modes by means of the keyboard 110 or any other means such as a mouse.

This screen 108 thus constitutes a display means adapted in particular to display an image and the number of acquired data bits.

The device 1, 2 also comprises a storage means 112 such as for example a hard disk. It also comprises a disk drive 114 adapted to cooperate with a floppy disk 116.

The floppy disk 116 and hard disk 112 can contain data for implanting the software of the invention as well as the code of the invention which, once read by the device, will be stored in the hard disk 112. According to a variant, the method enabling the device to implement the invention, and in particular the method of access to an image, can be stored in read only memory 104. Likewise, the coding methods and the various items of software 6, 7, 8, 9 described with reference to FIG. 1 can be stored in read only memory 104 or on the hard disk 112.

Naturally many modifications can be made to the example embodiments described above without departing from the scope of the invention.

Thus the SWF file might not contain the allocated bit budget S, this being stored in memory in the server computer 1.

In this case, this bit budget S is associated with the displayed image and the Internet address of the user of the client computer 1 who connects to the server computer 2.

When the method of access to an image is implemented, the step E43 of displaying the expended bit budget is implemented by interrogating the server computer 1, which is in a position to calculate the size of the acquired data compared with the allocated bit budget S and to return this information to the client computer with a view to its display, or to send it a warning message in the event of the allocated bit budget being exceeded.

The invention claimed is:

1. A method of access by a client computer to a digital image stored on a server computer via a communication network, said digital image being represented by a plurality of sets of digital data associated respectively with various blocks and various resolution levels of the image or with various blocks and various quality levels of the image, the method performed by the client computer comprising the steps of:

obtaining from said server computer a predetermined threshold value indicating a total number of bits of a digital image for which the client computer is authorized to acquire, the authorization being for previewing the image;

acquiring from the server computer an initial set of digital data representing a portion of the digital image, the initial set of digital data being associated with at least one initial block and an initial resolution level or at least one initial block and an initial quality level;

displaying on the client computer the acquired initial set of digital data for the portion of the digital image;

displaying on the client computer a size in bits representative of the total number of acquired data bits for said digital image;

receiving an instruction input by a user to navigate in the displayed portion of the digital image;

determining whether the instruction to navigate requires an acquisition of another set of data to be acquired from said server computer amongst said sets of digital data representing the digital image;

calculating a size in bits of said set of data to be acquired in a case where the determining step determines that acquisition of the another set of data is required;

comparing the number of previously acquired data bits incremented by said calculated size with the predetermined threshold value;

acquiring said another set of data if said number of acquired data bits incremented by said calculated size is less than said predetermined threshold value; and updating the size in bits representative of the total number of acquired data bits by adding the size of said another set of data acquired in the acquiring step, and updating the displayed size in bits representative of the total number of acquired data bits for said digital image, wherein said determining step determines that the instruction to navigate requires an acquisition of another set of data to be acquired in a case where the instruction is for a greater resolution level, a greater quality level or a translation outside of the previously acquired blocks, and wherein, when said determining step determines that the instruction to navigate does not require an acquisition of another set of data, the instruction to navigate is implemented and the displayed size in bits representative of the total number of acquired data bits for said digital image is not updated.

2. A method of access by a client computer to a digital image stored on a server computer via a communication network, said digital image being represented by a plurality of sets of digital data associated respectively with at least two various blocks and various resolution levels of the image and various quality levels of the image, said method comprising the steps of:

obtaining from said server computer a predetermined threshold value indicating a total number of bits of a digital image for which the client computer is authorized to acquire, the authorization being for previewing the image;

acquiring from the server computer an initial set of digital data representing a portion of the digital image, the initial set of digital data being associated with at least one initial block and an initial resolution level or at least one initial block and an initial quality level;

displaying on the client computer the acquired initial set of digital data for the portion of the digital image;

displaying on the client computer a size in bits representative of the total number of acquired data bits for said digital image receiving an instruction input by a user to navigate in the displayed portion of the digital image;

determining whether the instruction to navigate requires an acquisition of another set of data to be acquired from said server computer amongst said sets of digital data representing the digital image;

calculating a size in bits of said set of data to be acquired in a case where the determining step determines that acquisition of the another set of data is required;

comparing the number of previously acquired data bits incremented by said calculated size with the predetermined threshold value;

acquiring said another set of data if said number of acquired data bits incremented by said calculated size is less than said predetermined threshold value; and updating the size in bits representative of the total number of acquired data bits by adding the size of said another set of data acquired in the acquiring step, and updating the displayed size in bits representative of the total number of acquired data bits for said digital image, wherein said determining step determines that the instruction to navigate requires an acquisition of another set of data to be acquired in a case where the instruction is for a greater resolution level, a greater quality level or a translation outside of the previously acquired blocks, and wherein, when said determining step determines that the instruction to navigate does not require an acquisition of another set of data, the instruction to navigate is implemented and the displayed size in bits representative of the total number of acquired data bits for said digital image is not updated.

3. The method according to one of claim 1 or 2, wherein said threshold value of bits is predetermined according to a bit size of the sets of digital data associated with the digital image.

4. The method according to claim 3, wherein said threshold value is equal to a percentage of between 25% and 50% of the bit size of said sets of digital data associated with the digital image.

5. The method according to one of claim 1 or 2, wherein said comparing step is implemented on the client computer, and wherein said predetermined threshold value is stored on the client computer.

6. The method according to one of claim 1 or 2, further comprising a step of displaying a warning message on the client computer when the number of acquired data bits incremented by the calculated size is greater than said predetermined threshold value.

7. A computer comprising means for implementing the method according to one of claim 1 or 2.

8. A communication network comprising means for implementing the method according to one of claim 1 or 2.

9. A non-transitory computer-readable medium, which can be read by a microprocessor, comprising software code for implementing the method according to one of claim 1 or 2.

10. The method according to one of claim 1 or 2, wherein in said obtaining step, a file containing said predetermined threshold value is received by said client computer, and wherein said predetermined threshold value is associated with said digital image.

11. A method according to one of claim 1 or 2, wherein the steps of displaying, receiving, determining, calculating, comparing, acquiring and updating are reiterated if the updated size in bits representative of the total number of acquired data bits is less than the predetermined threshold, and wherein in the displaying step, the updated size in bits representative of the total number of acquired data bits is displayed.

12. A client device for accessing a digital image stored on a server computer via a communication network, said digital image being represented by a plurality of sets of digital data associated respectively with various blocks and various resolution levels of the image or with various blocks and various quality levels of the image, comprising:

at least one processor and memory;

obtaining means for obtaining from said server computer a predetermined threshold value indicating a total number of bits of a digital image for which the client device is authorized to acquire, the authorization being for previewing the image;

first acquiring means for acquiring from the server computer an initial set of digital data representing a portion of the digital image, the initial set of digital data being associated with at least one initial block and an initial resolution level or at least one initial block and an initial quality level;

first displaying means for displaying on the client device the acquired initial set of digital data for the portion of the digital image;

second displaying means for displaying on the client device a size in bits representative of the total number of acquired data bits for said digital image;

receiving means for receiving an instruction input by a user to navigate in the displayed portion of the digital image;

determining means for determining whether the instruction to navigate requires an acquisition of another set of data to be acquired from said server computer amongst said sets of digital data representing the digital image;

calculating means for calculating a size in bits of said set of data to be acquired in a case where the determining means determines that acquisition of the another set of data is required;

comparing means for comparing the number of previously acquired data bits incremented by said calculated size with the predetermined threshold value;

second acquiring means for acquiring said another set of data if said number of acquired data bits incremented by said calculated size is less than said predetermined threshold value; and updating means for updating the size in bits representative of the total number of acquired data bits by adding the size of said another set of data acquired by the second acquiring means, wherein said determining means determines that the instruction to navigate requires an acquisition of another set of data to be acquired in a case where the instruction is for a greater resolution level, a greater quality level or a translation outside of the previously acquired blocks, and wherein, when said determining means determines that the instruction to navigate does not require an acquisition of another set of data, the instruction to navigate is implemented and the displayed size in bits representative of the total number of acquired data bits for said digital image is not updated.

13. A client device for accessing a digital image stored on a server computer via a communication network, said digital image being represented by a plurality of sets of digital data associated respectively with at least two various blocks and various resolution levels of the image and various quality levels of the image, comprising:

at least one processor and memory;

obtaining means for obtaining from said server computer a predetermined threshold value indicating a total number of bits of a digital image for which the client device is authorized to acquire, the authorization being for previewing the image;

first acquiring means for acquiring from the server computer an initial set of digital data representing a portion of the digital image, the initial set of digital data being associated with at least one initial block and an initial resolution level or at least one initial block and an initial quality level;

first displaying means for displaying on the client device the acquired initial set of digital data for the portion of the digital image;

second displaying means for displaying on the client device a size in bits representative of the total number of acquired data bits for said digital image;

receiving means for receiving an instruction input by a user to navigate in the displayed portion of the digital image;

determining means for determining whether the instruction to navigate requires an acquisition of another set of data to be acquired from said server computer amongst said sets of digital data representing the digital image;

calculating means for calculating a size in bits of said set of data to be acquired in a case where said determining means determines that acquisition of the another set of data is required;

comparing means for comparing a number of previously acquired data bits incremented by said calculated size with the predetermined threshold value;

second acquiring means for acquiring said another set of data if said number of acquired data bits incremented by said calculated size is less than said predetermined threshold value; and updating means for updating the size in bits representative of the total number of acquired data bits by adding the size of said another set of data acquired by the second acquiring means, wherein said determining means determines that the instruction to navigate requires an acquisition of another set of data to be acquired in a case where the instruction is for a greater resolution level, a greater quality level or a translation outside of the previously acquired blocks, and wherein, when said determining means determines that the instruction to navigate does not require an acquisition of another set of data, the instruction to navigate is implemented and the displayed size in bits representative of the total number of acquired data bits for said digital image is not updated.

14. The device according to one of claim 12 or 13, wherein the device is implemented into a client computer of the communication network.

15. A method of access by a client computer to a digital image stored on a server computer via a communication network, said digital image being represented by a plurality of sets of digital data associated respectively with various blocks and various resolution levels of the image or with various blocks and various quality levels of the image, comprising the steps of:

obtaining from said server computer a predetermined threshold value indicating a total number of bits of a digital image for which the client computer is authorized to acquire, the authorization being for previewing the image;

acquiring from the server computer an initial set of digital data representing a portion of the digital image, the initial set of digital data being associated with at least one initial block and an initial resolution level or at least one initial block and an initial quality level;

displaying on the client computer the acquired initial set of digital data for the portion of the digital image;

displaying a size in bits representative of the total number of acquired data bits for said digital image;

receiving an instruction input by a user to navigate in the displayed portion of the digital image;

determining whether the instruction to navigate requires an acquisition of another set of data to be acquired from said server computer amongst said sets of digital data representing the digital image;

calculating a size in bits of said set of data to be acquired in a case where the determining step determines that acquisition of the another set of data is required;

comparing the number of previously acquired data bits incremented by said calculated size with the predetermined threshold value;

acquiring said another set of data if said number of acquired data bits incremented by said calculated size is less than said predetermined threshold value; and updating the size in bits representative of the total number of acquired data bits by adding the size of said set of data acquired in the acquiring step, and updating the displayed size in bits representative of the total number of acquired data bits for said digital image; and displaying a warning message on the client computer when the number of acquired data bit incremented by the calculated size is greater than the predetermined threshold value of bits, wherein said determining step determines that the instruction to navigate requires an acquisition of another set of data to be acquired in a case where the instruction is for a greater resolution level, a greater quality level or a translation outside of the previously acquired blocks, and wherein, when said determining step determines that the instruction to navigate does not require an acquisition of another set of data, the instruction to navigate is implemented and the displayed size in bits representative of the total number of acquired data bits for said digital image is not updated.

16. A method according to claim 15, wherein the warning message is a text message.

17. A method according to one of claim 15 or 16, wherein when the warning message is displayed, the step of displaying a size in bits representative of the number of acquired data bits is implemented, and the user is provided with an option to navigate in the image.

18. A method according to one of claim 15 or 16, wherein when the warning message is displayed, the user is provided with an option of paying a price and navigating in the entirety of the image.

* * * * *